(12) United States Patent
Lee (10) Patent No.: US 10,015,438 B1
(45) Date of Patent: Jul. 3, 2018

(54) TIME-LAPSE PHOTOGRAPHY SYSTEM AND METHOD

(71) Applicant: GrassWonder Inc., Taipei (TW)

(72) Inventor: Ching-Kang Lee, Taipei (TW)

(73) Assignee: GRASSWONDER INC., Taipei (TW)

( * ) Notice: Subject to any disclaimer, the term of this patent is extended or adjusted under 35 U.S.C. 154(b) by 0 days.

(21) Appl. No.: 15/622,975

(22) Filed: Jun. 14, 2017

(30) Foreign Application Priority Data

Apr. 13, 2017 (TW) .............................. 106112371 A (51) Int. Cl.
*H04N 5/77* (2006.01)
*H04N 5/915* (2006.01)
*H04N 5/225* (2006.01)
*H04N 5/232* (2006.01)

(52) U.S. Cl.
CPC ........... *H04N 5/915* (2013.01); *H04N 5/2251* (2013.01); *H04N 5/23203* (2013.01); *H04N 5/23216* (2013.01); *H04N 5/23293* (2013.01)

(58) Field of Classification Search
CPC .. H04N 5/915; H04N 5/2251; H04N 5/23293; H04N 5/23216; H04N 5/23203
USPC ....... 386/226, 228, 229, 231, 230, 248, 322, 386/323
See application file for complete search history.

(56) References Cited

U.S. PATENT DOCUMENTS

| 2004/0017470 A1* | 1/2004 | Hama | G08B 13/19626 348/42 |
| 2015/0007869 A1* | 1/2015 | Stein | F24J 2/38 136/246 |

* cited by examiner

*Primary Examiner* — Robert Chevalier
(74) *Attorney, Agent, or Firm* — Chun-Ming Shih (57) ABSTRACT

The present invention provides a time-lapse photography system, which comprises a rotating platform and an electronic device comprising a time-lapse photography program. The time-lapse photography program sets a first position, a second position, and a time for recording video, and calculates an angular velocity. When the electronic device executes a time-lapse photography process, the time-lapse photography program sends a start signal and an indication signal including a message of angular velocity, the rotating platform starts to rotate from the start position based on the start signal and control a rotating speed based on the angular velocity, while the electronic device executes a video recording process. When the rotating platform has rotated to the second position, the time-lapse photography program will send an end signal, the rotating of the rotating platform can be stopped, thereby the electronic device can finish the video recording process to generate a video.

10 Claims, 9 Drawing Sheets

TIME-LAPSE PHOTOGRAPHY SYSTEM AND METHOD

CROSS-REFERENCE TO RELATED APPLICATIONS

This non-provisional application claims priority claim under 35 U.S.C. § 119(a) on Taiwan Patent Application No. 106112371 filed Apr. 13, 2017, the entire contents of which are incorporated herein by reference.

FIELD OF THE INVENTION

The present invention relates to a system and method capable of executing time-lapse photography.

BACKGROUND

Time-lapse photography is technique of special shooting. A time-lapse photography video are usually captured at a low frame rate but played at normal frame rate, so that the time-lapse photography video enable an audience to observe the long-term changes in motion in a short period of time. For example, an image of a dynamic scene may be captured once every 10 seconds in one hour time span, and then played at a frame rate of 30 frames per second. That is, the image is displayed at 300 times of the normal speed. An audience therefore may observe the changes within that one hour time span with a 12-second running length video.

For the reason, the present invention provides a novel time-lapse photography control means, in which the user can easy to set a flow of executing of time-lapse photography on an electronic device with recording video function. Thus, the electronic device disposed on a rotating platform is capable of controlling the rotation of the rotating platform in accordance with the set flow of executing of time-lapse photography, it is the object to be achieved by the present invention.

SUMMARY

It is one object of the present invention to provide a time-lapse photography system and method, in which provides a novel time-lapse photography control means. The user can easy to set a flow of executing of time-lapse photography by a time-lapse photography program of an electronic device, so that the rotating platform can execute to rotate based on the setting result of time-lapse photography to generate the time-lapse photography video, successfully.

For achieving above objects, the present invention provides a time-lapse photography system, comprising: a rotating platform comprising a Bluetooth chip, a motor controller, and a motor, wherein the motor controller is connected to the Bluetooth chip and the motor, and an electronic device, being a device for recording video, and comprising a time-lapse photography program, a calculator, a display interface, and a lens, wherein the calculator is connected to the display interface and the lens, the electronic device is disposed on the rotating platform, the rotating platform controls the rotating of the motor by receiving at least one signal sent from the time-lapse photography program of the electronic device via the Bluetooth chip, angles of recording video of the lens of the electronic device are changed by the rotating of the motor of the rotating platform, wherein the time-lapse photography program comprises a operation interface, the operation interface is displayed on the display interface when the time-lapse photography program is executed, a first position, a second position, and a time for recording video are able to be set by the operating of the operation interface, the time-lapse photography program calculates an angular velocity according to an angle difference between the first position and a second position, and the time for recording video; when the electronic device executes a time-lapse photography process, the time-lapse photography program will send a start signal, and an indication signal including a message of the angular velocity to the rotating platform, the motor controller of the rotating platform can control the motor to rotate from the first position based on the start signal and control a rotating speed of the motor based on the angular velocity indicated by the indication signal, while the electronic device can execute a video recording process based on the start signal; afterwards, when the rotating platform has rotated to the second position or the video recording process executed by the electronic device has reached the time for recording video, the time-lapse photography program will send an end signal, the motor controller of the rotating platform can stop the rotating of the motor based on the end signal, while the electronic device can finish the video recording process based on the end signal so as to generate a time-lapse photography video.

In one embodiment of the present invention, wherein a photography acceleration times is able to be set by the operating of the operation interface of the time-lapse photography program, the time-lapse photography program calculates a playtime of the time-lapse photography video according to the photography acceleration times and the time for recording video.

In one embodiment of the present invention, wherein the electronic device is a communication device, when the electronic device receives an incoming call during the execution of the time-lapse photography process, the time-lapse photography program will send a pause signal to pause the rotating of the motor of the rotating platform and the execution of the video recording process, while record an interrupted recording position of the rotating platform and a remaining time about recording the time-lapse photography video.

In one embodiment of the present invention, wherein when the electronic device terminates a talk of the incoming call, the time-lapse photography program will pop up a prompt box for inquiring whether to continue to record the time-lapse photography video; afterwards, if user presses a continuation button in the prompt box, the time-lapse photography program will send a continuation signal to the rotating platform, the motor of the rotating platform can continue to rotate from the interrupted recording position by the control of the motor controller of the rotating platform based on the continuation signal, thereby the electronic device continues to execute the unfinished video recording process.

In one embodiment of the present invention, wherein the motor is a direct current motor or a stepping motor, and the motor controller is a direct current motor controller or a stepping motor controller.

In one embodiment of the present invention, wherein the motor controller can control the rotating of the motor based on a means of pulse width modulation.

The present invention further provides a time-lapse photography method, which is applied in a time-lapse photography system, the time-lapse photography system comprising a rotating platform and an electronic device capable of recording video, the rotating platform comprising a Bluetooth chip, a motor controller, and a motor, the electronic device comprising a time-lapse photography program, a calculator, a display interface, and a lens, wherein the electronic device is disposed on the rotating platform, the rotating platform controls the rotating of the motor by receiving at least one signal sent from the time-lapse photography program of the electronic device via the Bluetooth chip, angles of taking photo or recording video of the lens of the electronic device are changed by the rotating of the motor of the rotating platform, the steps of the time-lapse photography method comprising: setting a first position, a second position, and a time for recording video by the operating of an operation interface of the time-lapse photography program; calculating an angular velocity, by the time-lapse photography program, according to an angle difference between the first position and a second position, and the time for recording video; and executing a time-lapse photography process by the electronic device, the steps of the time-lapse photography process comprising: sending a start signal, and an indication signal including a message of the angular velocity to the rotating platform by the time-lapse photography program; controlling the motor to rotate from the first position by a motor controller of the rotating platform based on the start signal; controlling a rotational speed of the motor by the motor controller of the rotating platform based on the angular velocity; executing a video recording process by the electronic device based on the start signal; sending an end signal to the rotating platform by the time-lapse photography program when the rotating platform has rotated to the second position or the video recording process executed by the electronic device has reached the time for recording video; stopping the rotating of the motor by the motor controller of the rotating platform based on the end signal; and enabling the electronic device to finish the video recording process based on the end signal so as to generate a time-lapse photography video.

In one embodiment of the present invention, further comprising the following steps: setting a photography acceleration times by the operating of the operation interface of the time-lapse photography program; and calculating a playtime of the time-lapse photography video by the time-lapse photography program according to the photography acceleration times and the time for recording video.

In one embodiment of the present invention, further comprising the following steps: determining whether the electronic device receives an incoming call during the execution of the time-lapse photography process, wherein if the electronic device receives the incoming call, the time-lapse photography program will send a pause signal and thereby the electronic device can execute a pause process based on the pause signal; otherwise, if the electronic device does not receive the incoming call, the electronic device will continue to execute the time-lapse photography process; and executing the pause process comprising the following steps: pausing the rotating of the motor by the motor controller of the rotating platform based on the pause signal; pausing the video recording process executed by the electronic device based on the pause signal; and recording an interrupted recording position of the rotating platform and a remaining time about recording the time-lapse photography video.

In one embodiment of the present invention, further comprising the following steps: popping up a prompt box by the time-lapse photography program when the electronic device terminates a talk of the incoming call, wherein the prompt box is for inquiring whether to continue to record the time-lapse photography video; determining user whether to press a continuation button in the prompt box, if it is, the time-lapse photography program will send a continuation signal to the rotating platform; if it is not, the electronic device will stop the video recording process; controlling the motor to rotate from the interrupted recording position by the motor controller of the rotating platform based on the continuation signal; and continuing to execute the unfinished video recording process by the electronic device based on the continuation signal.

DETAILED DESCRIPTION OF THE PREFERRED EMBODIMENTS

Figure 1:
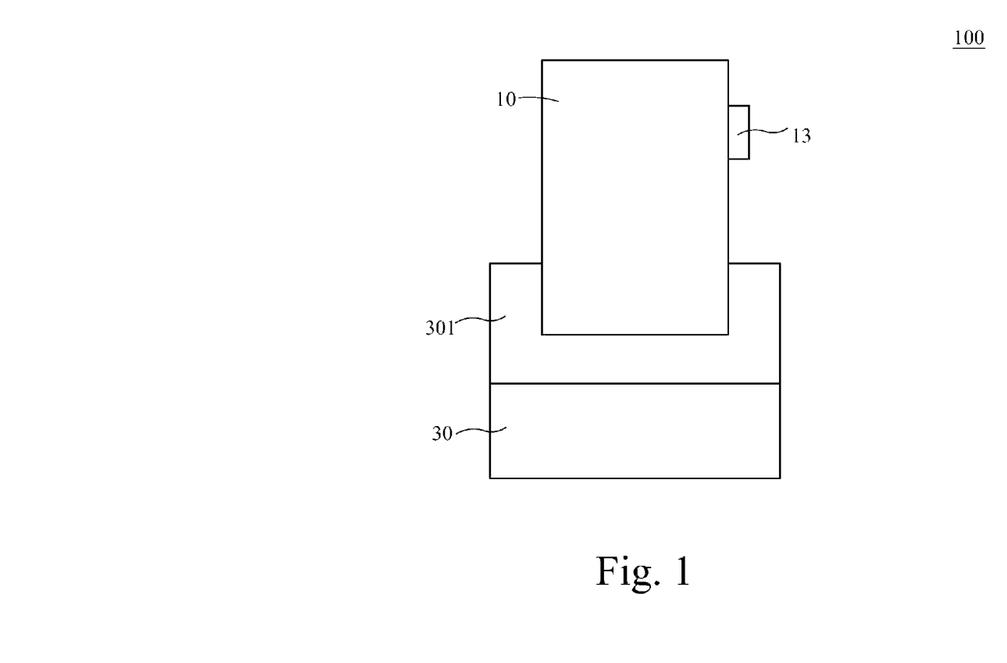
FIG. 1 is a structure diagram of a time-lapse photography system according to one embodiment of the present invention.
Figure 2:
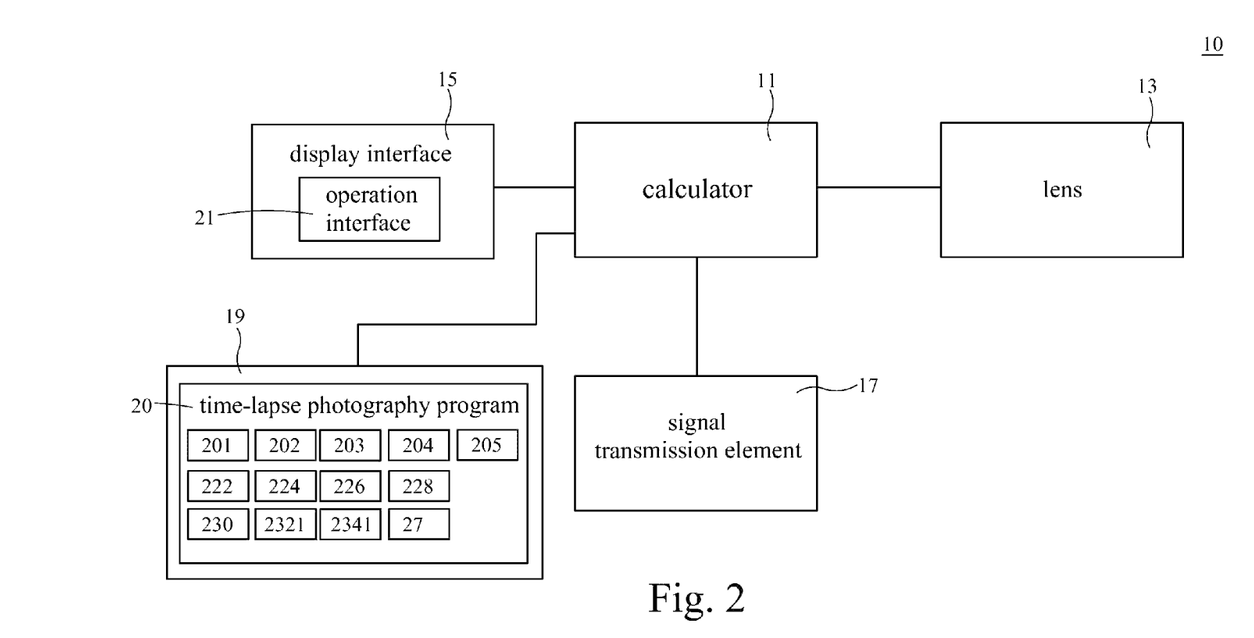
FIG. 2 is a circuit structure diagram of an electronic device according to one embodiment of the present invention.
Figure 3:
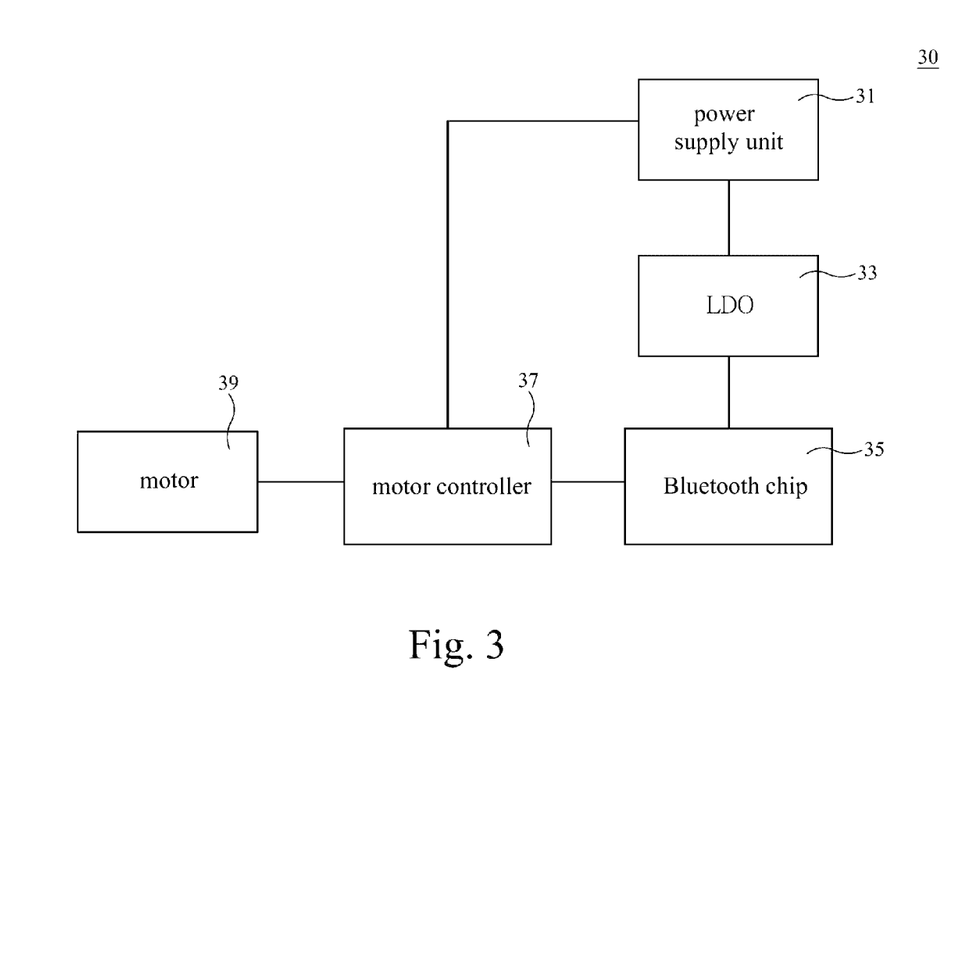
FIG. 3 is a circuit structure diagram of a rotating platform according to one embodiment of the present invention.

Referring to FIG. 1, FIG. 2, and FIG. 3, there are shown a structure diagram of a time-lapse photography system according to one embodiment of the present invention, a circuit structure diagram of an electronic device according to one embodiment of the present invention, and a circuit structure diagram of a rotating platform according to one embodiment of the present invention. As shown in FIGS. 1 to 3, the time-lapse photography system 100 of the present invention comprises an electronic device 10 and a rotating platform 30. The electronic device 10 is a device capable of recording video. For example, the electronic device 10 is a smart phone, a tablet, or a camera. The rotating platform 30 is a rotatable self-photographing device. The electronic device 10 is fixed on a fixing seat 301 of the rotating platform 30. The angles of recording video of the lens of the electronic device 10 are changed by the rotating of the rotating platform 30 so as to execute a time-lapse photography process.

The electronic device 10 comprises a calculator 11, a lens 13, a display interface 15, a signal transmission element 17, and a data storage unit 19. The data storage unit 19 is used for storing a time-lapse photography program 20. The signal transmission element 17 is an element conforming to the Bluetooth transmission specification.

The rotating platform 30 comprises a power supply unit 31, a linear regulator (LDO) 33, a Bluetooth chip 35, a motor controller 37, and a motor 39. The motor controller 37 is connected to the Bluetooth chip 35 and the motor 39. The power supply unit 31 is supplied with a power supply required for the operations of the motor controller 37 and the Bluetooth chip 35. Besides, the power supply supplied by the power supply unit 31 is transmitted to the Bluetooth chip 35 via the LDO 33. The motor controller 37 of the rotating platform 30 can control the rotating of the motor 39 by receiving at least one signal sent from the time-lapse photography program 20 of the electronic device 10 via the Bluetooth chip 35. In the present invention, the motor controller 37 is a direct current (DC) motor controller or a stepping motor controller, and the motor 39 is a direct current (DC) motor or a stepping motor. The motor controller 37 can control the rotating of the motor 39 by a means of pulse width modulation (PWM).

Figure 4A:
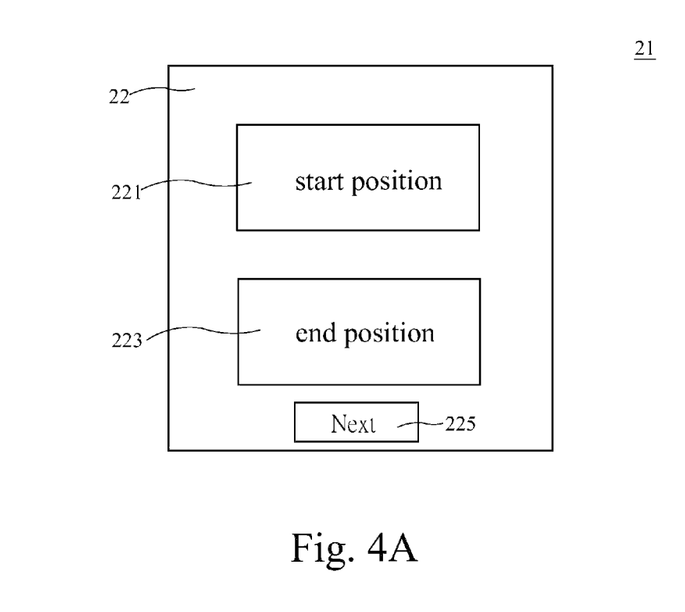
FIG. 4A is a schematic diagram of a first page of an operation interface of a time-lapse photography program of the present invention.
Figure 4B:
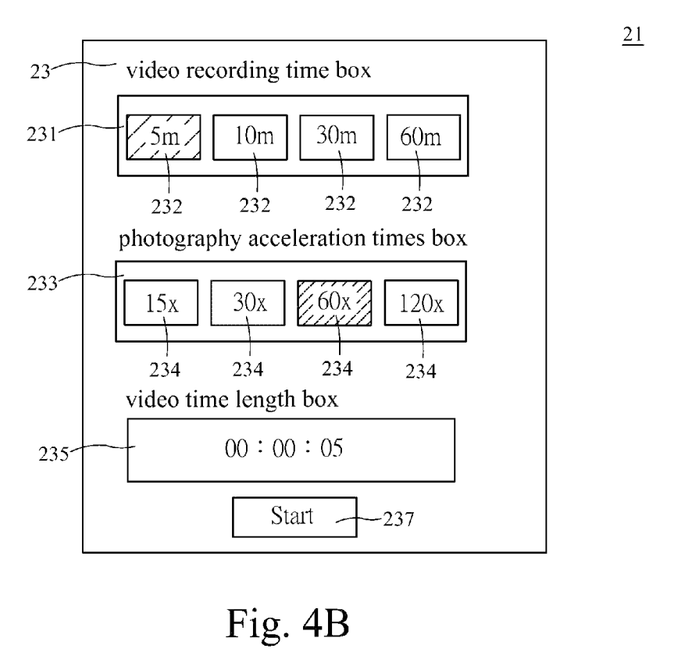
FIG. 4B is a schematic diagram of a second page of the operation interface of the time-lapse photography program of the present invention.

The time-lapse photography program 20 comprises an operation interface 21. When the time-lapse photography program 20 is executed, firstly, a first page 22 of the operation interface 21 is displayed on the display interface 15, the first page 22 comprises a start position button 221 and an end position button 223, as shown in FIG. 4A. When the user places the rotating platform 30 in a first position 222, the user can press the start position button 221 so as to set the first position 222 as a start position. Then, the user can rotate the rotating platform 30 by a way of hand-operated or pressed button. When the rotating platform 30 is rotated to a second position 224, the user can press the end position button 223 so as to set the second position 224 as an end position. After the first position 222 and the second position 224 are set, the user can press a next step button 225 within the first page 22, and then a second page 23 of the operation interface 21 is displayed, as shown in FIG. 4B. The second page 23 comprises a video recording time box 231, a photography acceleration times box 233, and a video time length box 235. The user may press one of those video recording times buttons 232 in the video recording time box 231 to select a video recording times 2321, for example, the user can press a 5 m button 232 to select a 5 minute as the video recording times 2321. The user may press one of those photography acceleration times buttons 234 in the photography acceleration times box 223 to select a photography acceleration times 2341, for example, the user can press a 60x button 234 to select a 60 times as the photography acceleration times 2341. Thus, the video time length box 235 may establish a video of a specific time length based on the selected video recording time 2321 in the video recording time box 231 and the selected photography acceleration times 2341 in the photography acceleration times box 223. The time-lapse photography program 20 calculates an angular velocity 230 according to an angle difference between the first position 222 and the second position 224, and the selected video recording time 2321. For example, the angle difference between the first position 222 and a second position 224 is 300 degrees, the video recording time 2321 is selected as the five minutes (300 seconds), thereby the angular velocity 230 will be 1 deg/sec. In the present invention, the first position 222, the second position 224, the video recording time 2321, and the photography acceleration times 2341, as well as the angular velocity 230 will be recorded in the data storage unit 19. When the above setting process is completed, the user can press a start button 237, thereby the electronic device 10 will start to execute a time-lapse photography process.

When the electronic device 10 executes a time-lapse photography process, the time-lapse photography program 20 will send a start signal 201 including a message of the first position 222, and an indication signal 202 including a message of the angular velocity 230. The rotating platform 30 receives the start signal 201 and the indication signal 202 via the Bluetooth chip 35. The motor controller 37 of the rotating platform 30 can control the motor 39 to rotate from the first position 222 based on the start signal 201 and control a rotating speed of the motor 39 based on the angular velocity 230 indicated by the indication signal 202, while the electronic device 10 executes a video recording process based on the start signal 201. Afterward, when the rotating platform 30 has rotated to the second position 224 or the video recording process executed by the electronic device 10 has reached the video recording time 2321, the time-lapse photography program 20 will send an end signal 203. The rotating platform 30 receives the end signal 203 via the Bluetooth chip 35. The motor controller 37 of the rotating platform 30 can stop the rotating of the motor 39 based on the end signal 203, and therefore the electronic device 10 can finish the video recording process based on the end signal 203 so as to generate a time-lapse photography video 27.

Accordingly, the present invention provides a novel time-lapse photography control means, in which the user can easy to set a flow of executing of time-lapse photography by the time-lapse photography program 20 of the electronic device 10 so that the rotating platform 30 can execute to rotate based on the setting result of time-lapse photography to generate the time-lapse photography video 27, successfully.

Figure 4C:
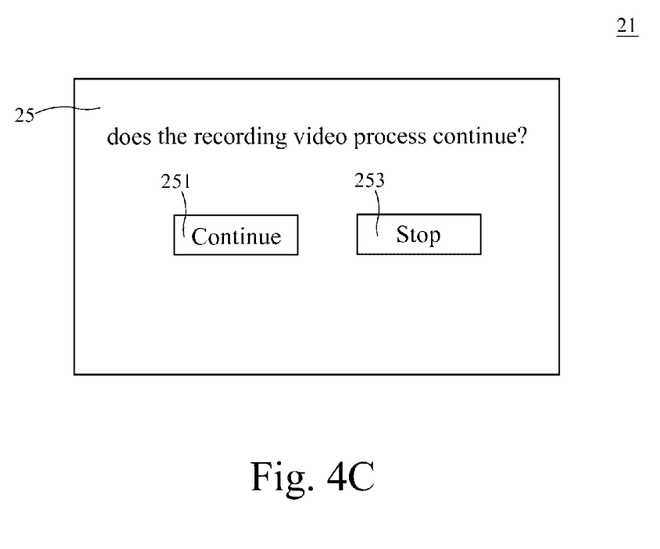
FIG. 4C is a schematic diagram of a prompt box of the operation interface of the time-lapse photography program of the present invention.

In one embodiment of the present invention, the electronic device 10 is a communication device, for example, smart phone. When the electronic device 10 receives an incoming call during the execution of the time-lapse photography process, the time-lapse photography program 20 will send a pause signal to pause the rotating of the motor 39 of the rotating platform 30 and the execution of the video recording process, while record an interrupted recording position 226 of the rotating platform 30 and a remaining time 228 about recording the time-lapse photography video 27. Afterwards, when the electronic device 10 terminates a talk of the incoming call, the time-lapse photography program 20 will pop up a prompt box 25 for inquiring whether the user continues to record the time-lapse photography video 27, as shown in FIG. 4C. If the user presses a continuation button 251 in the prompt box 25, the time-lapse photography program 20 will send a continuation signal 205 to the rotating platform 30, the motor 39 can continue to rotate from the interrupted recording position 226 by the control of the motor controller 37 of the rotating platform 30 based on the continuation signal 205, thereby the electronic device 10 can continue to execute the unfinished video recording process.

Figure 5:
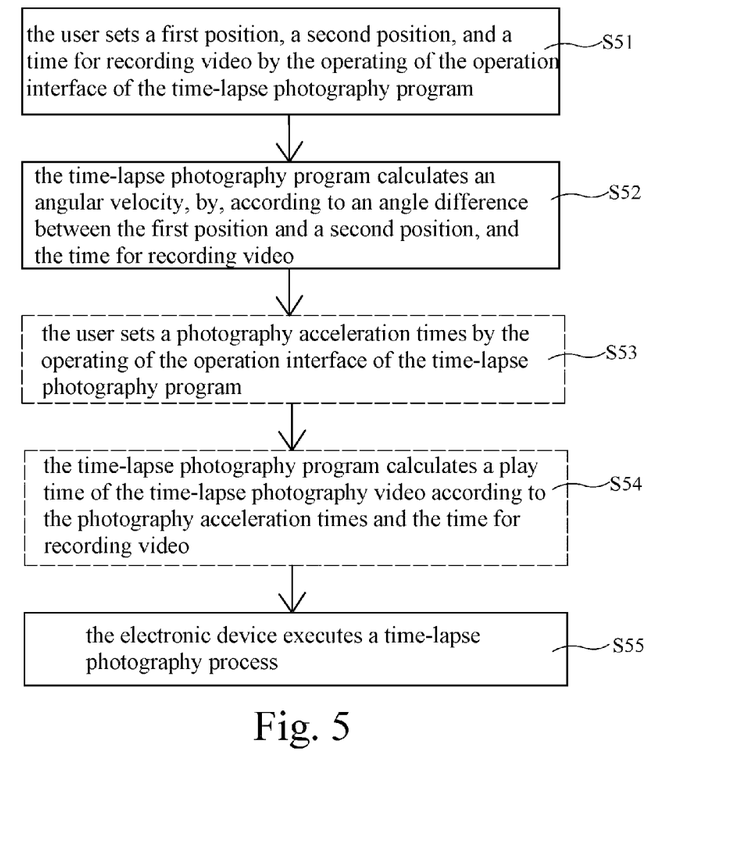
FIG. 5 is a flow chart of a time-lapse photography method according to one embodiment of the present invention.
Figure 6:
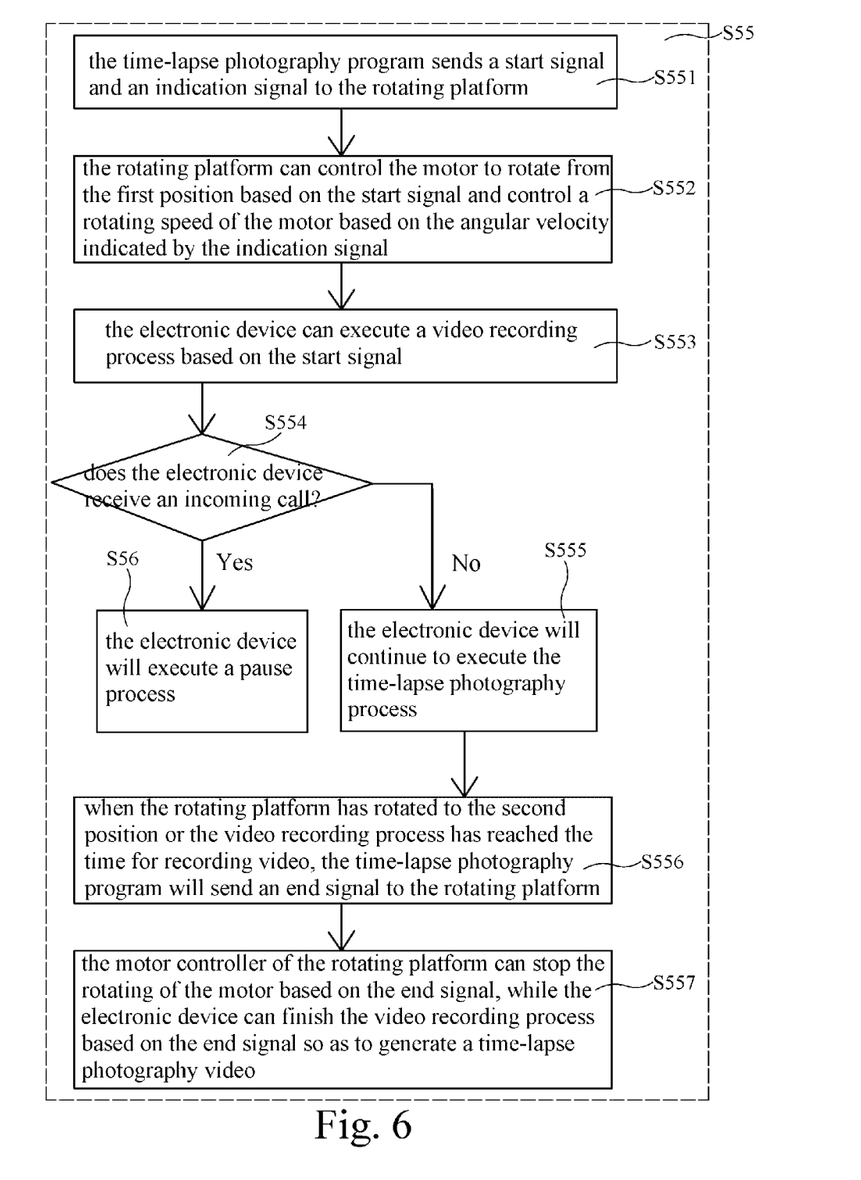
FIG. 6 is a flow chart of a time-lapse photography process according to one embodiment of the present invention.

Referring to FIG. 5 and FIG. 6, there are shown a flow chart of a time-lapse photography method according to one embodiment of the present invention and a flow chart of a time-lapse photography process according to one embodiment of the present invention. As shown in FIG. 5, firstly, in step S51, the user sets a first position 222, a second position 224, and a video recording time 2321 by the operating of the operation interface 21 of the time-lapse photography program 20. In step S52, the time-lapse photography program 20 calculates an angular velocity 230 according to the angle difference between the first position 222 and a second position 224, as well as the video recording time 2321. After the first position 222, the second position 224, and the video recording time 2321 are set and the angular velocity 230 is calculated, continuing to proceed step S55, the electronic device 10 starts to execute the time-lapse photography process.

Steps S551-S557 of the time-lapse photography process are disclosed in FIG. 6. In the step S551, the time-lapse photography program 20 will send a start signal 201 including a message of the first position 222, and a indication signal 202 including a message of the angular velocity 230 to the rotating platform 30. In the step S553, the rotating platform 30 receives the start signal 201 and the indication signal 202, and then the motor controller 37 of the rotating platform 30 is able to control the motor 39 to rotate from the first position 222 based on the start signal 201 and control a rotating speed of the motor 39 based on the angular velocity 230 indicated by the indication signal 202. In the step S553, the electronic device 10 executes a video recording process based on the start signal 201. In the step S556, when the rotating platform 30 has rotated to the second position 224 or the video recording process executed by the electronic device 10 has reached the video recording time 2321, the time-lapse photography program 20 will send an end signal 203 to the rotating platform 30. In the step S557, the motor controller 37 of the rotating platform 30 can stop the rotating of the motor 39 based on the end signal 203, and thereby the electronic device 10 can finish the video recording process based on the end signal 203 so as to generate a time-lapse photography video 27.

Referring to FIG. 5, again, the time-lapse photography method further proceeds a step S53 and a step S54 before the step S55 proceeded. In the step S53, the time-lapse photography program 20 is able to set a photography acceleration times 2341 by the operating of the operation interface 21 of the time-lapse photography program 20. In the step S54, the time-lapse photography program 20 will calculate a playtime of the video 27 based on the photography acceleration times 2341 and the video recording time 2321.

Referring to FIG. 6, again, the time-lapse photography process further comprises steps S554, S56, and S555. In the step S554, the electronic device 10 determines whether to receive an incoming call during the execution of the time-lapse photography process. If the electronic device 10 receives the incoming call, the time-lapse photography program 20 sends a pause signal 204, and then the electronic device 10 executes the step S56 of a pause process based on the pause signal 204. Otherwise, if the electronic device 10 does not receive the incoming call, the electronic device 10 will continue to execute the step S555 of the time-lapse photography process.

Figure 7:
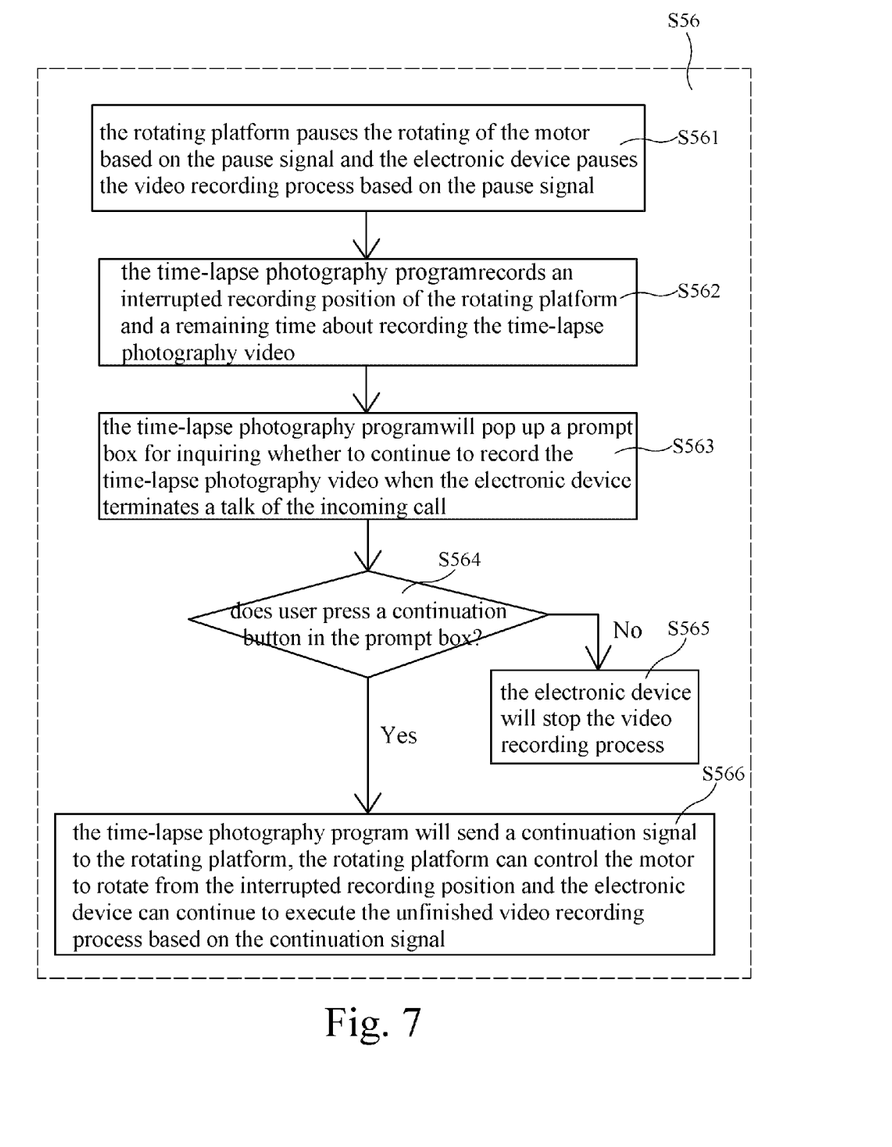
FIG. 7 is a flow chart of a pause process according to one embodiment of the present invention.

Referring to FIG. 7, there is shown a flow chart of a pause process according to one embodiment of the present invention. As shown FIG. 7, in step S561, the motor controller 37 of the rotating platform 30 will pause the rotating of the motor 39 based on the pause signal 204, while the electronic device 10 will pause the video recording process based on the pause signal 204. In step 562, the time-lapse photography program 20 will record an interrupted recording position 226 of the rotating platform 30 and a remaining time 228 about recording the time-lapse photography video 27. In step S563, the time-lapse photography program 20 will pop up a prompt box 25 when the electronic device 10 has terminated a talk of the incoming call, wherein the prompt box 25 is for inquiring whether to continue to record the time-lapse photography video 27. Sequentially, the time-lapse photography program 20 determines whether the user presses a continuation button 251 in the prompt box 25, if it is, the step S565 will be proceeded. In the step S565, the time-lapse photography program 20 will send a continuation signal 205 to the rotating platform 30, the motor controller 37 of the rotating platform 30 will control the motor 39 to rotate from the interrupted recording position 226 based on the continuation signal 205, while the electronic device 20 will continue to execute the unfinished video recording process based on the continuation signal 205. On the contrary, the user didn't press the continuation button 251 but pressed an end button 253, a step S565 will be proceeded, the rotating platform 30 will stop to rotate, and the electronic device 10 will stop the video recording process.

The above disclosure is only the preferred embodiment of the present invention, and not used for limiting the scope of the present invention. All equivalent variations and modifications on the basis of shapes, structures, features and spirits described in the claims of the present invention should be included in the claims of the present invention.

The invention claimed is:

1. A time-lapse photography system, comprising:
a rotating platform comprising a Bluetooth chip, a motor controller, and a motor, wherein the motor controller is connected to the Bluetooth chip and the motor; and
an electronic device, being a device for recording video, and comprising a time-lapse photography program, a calculator, a display interface, and a lens, wherein the calculator is connected to the display interface and the lens, the electronic device is disposed on the rotating platform, the rotating platform controls the rotating of the motor by receiving at least one signal sent from the time-lapse photography program of the electronic device via the Bluetooth chip, angles of recording video of the lens of the electronic device are changed by the rotating of the motor of the rotating platform, wherein the time-lapse photography program comprises a operation interface, the operation interface is displayed on the display interface when the time-lapse photography program is executed, a first position, a second position, and a time for recording video are able to be set by the operating of the operation interface, the time-lapse photography program calculates an angular velocity according to an angle difference between the first position and a second position, and the time for recording video;
when the electronic device executes a time-lapse photography process, the time-lapse photography program will send a start signal, and an indication signal including a message of the angular velocity to the rotating platform, the motor controller of the rotating platform can control the motor to rotate from the first position based on the start signal and control a rotating speed of the motor according to the angular velocity indicated by the indication signal, while the electronic device can execute a video recording process based on the start signal; afterward, when the rotating platform has rotated to the second position or the video recording process executed by the electronic device has reached the time for recording video, the time-lapse photography program will send an end signal, the motor controller of the rotating platform can stop the rotating of the motor based on the end signal, while the electronic device can finish the video recording process based on the end signal so as to generate a time-lapse photography video.

2. The time-lapse photography system according to claim 1, wherein a photography acceleration times is able to be set by the operating of the operation interface of the time-lapse photography program, the time-lapse photography program calculates a playtime of the time-lapse photography video according to the photography acceleration times and the time for recording video.

3. The time-lapse photography system according to claim 1, wherein the electronic device is a communication device, when the electronic device receives an incoming call during the execution of the time-lapse photography process, the time-lapse photography program will send a pause signal to pause the rotating of the motor of the rotating platform and the execution of the video recording process, while record an interrupted recording position of the rotating platform and a remaining time about recording the time-lapse photography video.

4. The time-lapse photography system according to claim 3, wherein when the electronic device terminates a talk of the incoming call, the time-lapse photography program will pop up a prompt box for inquiring whether to continue to record the time-lapse photography video; afterwards, if user presses a continuation button in the prompt box, the time-lapse photography program will send a continuation signal to the rotating platform, the motor of the rotating platform can continue to rotate from the interrupted recording position by the control of the motor controller of the rotating platform based on the continuation signal, thereby the electronic device continues to execute the unfinished video recording process.

5. The time-lapse photography system according to claim 1, wherein the motor is a direct current motor or a stepping motor, and the motor controller is a direct current motor controller or a stepping motor controller.

6. The time-lapse photography system according to claim 1, wherein the motor controller can control the rotating of the motor based on a means of pulse width modulation.

7. A time-lapse photography method, which is applied in a time-lapse photography system, the time-lapse photography system comprising a rotating platform and an electronic device capable of recording video, the rotating platform comprising a Bluetooth chip, a motor controller, and a motor, the electronic device comprising a time-lapse photography program, a calculator, a display interface, and a lens, wherein the electronic device is disposed on the rotating platform, the rotating platform controls the rotating of the motor by receiving at least one signal sent from the time-lapse photography program of the electronic device via the Bluetooth chip, angles of taking photo or recording video of the lens of the electronic device are changed by the rotating of the motor of the rotating platform, the steps of the time-lapse photography method comprising:
  setting a first position, a second position, and a time for recording video by the operating of an operation interface of the time-lapse photography program;
  calculating an angular velocity, by the time-lapse photography program, according to an angle difference between the first position and a second position, and the time for recording video; and
  executing a time-lapse photography process by the electronic device, the steps of the time-lapse photography process comprising:
    sending a start signal, and an indication signal including a message of the angular velocity to the rotating platform by the time-lapse photography program;
    controlling the motor to rotate from the first position by a motor controller of the rotating platform based on the start signal;
    controlling a rotational speed of the motor by the motor controller of the rotating platform based on the angular velocity;
    executing a video recording process by the electronic device based on the start signal;
    sending an end signal to the rotating platform by the time-lapse photography program when the rotating platform has rotated to the second position or the video recording process executed by the electronic device has reached the time for recording video;
    stopping the rotating of the motor by the motor controller of the rotating platform based on the end signal; and
    enabling the electronic device to finish the video recording process based on the end signal so as to generate a time-lapse photography video.

8. The time-lapse photography method according to claim 7, further comprising the following steps:
  setting a photography acceleration times by the operating of the operation interface of the time-lapse photography program; and
  calculating a playtime of the time-lapse photography video by the time-lapse photography program according to the photography acceleration times and the time for recording video.

9. The time-lapse photography method according to claim 7, further comprising the following steps:
  determining whether the electronic device receives an incoming call during the execution of the time-lapse photography process, wherein if the electronic device receives the incoming call, the time-lapse photography program will send a pause signal and thereby the electronic device will execute a pause process based on the pause signal; otherwise, if the electronic device does not receive the incoming call, the electronic device will continue to execute the time-lapse photography process; and
  executing the pause process comprising the following steps:
    pausing the rotating of the motor by the motor controller of the rotating platform based on the pause signal;
    pausing the video recording process executed by the electronic device based on the pause signal; and
    recording an interrupted recording position of the rotating platform and a remaining time about recording the time-lapse photography video.

10. The time-lapse photography method according to claim 9, further comprising the following steps:
  popping up a prompt box by the time-lapse photography program when the electronic device terminates a talk of the incoming call, wherein the prompt box is for inquiring whether to continue to record the time-lapse photography video;
  determining whether user presses a continuation button in the prompt box, if it is, the time-lapse photography program will send a continuation signal to the rotating platform; if it is not, the electronic device will stop the video recording process;
  controlling the motor to rotate from the interrupted recording position by the motor controller of the rotating platform based on the continuation signal; and
  continuing to execute the unfinished video recording process by the electronic device based on the continuation signal.

* * * * *